United States Patent [19]

Grunewald et al.

[11] 4,146,888

[45] Mar. 27, 1979

[54] HYDRAULIC SECURING DEVICE

[75] Inventors: Lynn O. Grunewald, Cudahy; Steven J. Hipp, Milwaukee, both of Wis.

[73] Assignee: Rite-Hite Corporation, Cudahy, Wis.

[21] Appl. No.: 841,205

[22] Filed: Oct. 11, 1977

[51] Int. Cl.² .................... B60D 7/00; G08B 21/00
[52] U.S. Cl. .................................. 340/679; 340/626;
340/687; 414/401
[58] Field of Search ............... 340/626, 687, 568, 679;
214/38 BB, 38 B, 38 BA

[56] References Cited

U.S. PATENT DOCUMENTS

| | | | |
|---|---|---|---|
| 3,918,037 | 11/1975 | Hall | 340/626 |
| 4,010,571 | 3/1977 | McGuire et al. | 214/38 BA |
| 4,016,990 | 4/1977 | Hodkin et al. | 214/38 BB |

FOREIGN PATENT DOCUMENTS 2353232  10/1972  Fed. Rep. of Germany ......... 214/38 B

*Primary Examiner*—Glen R. Swann, III

*Attorney, Agent, or Firm*—Neuman, Williams, Anderson & Olson

[57] ABSTRACT

A hydraulically actuated device secures the back end of a truck against a surface of a loading dock during loading and unloading of the truck. The device includes a self-aligning hydraulic cylinder which is adjustably mounted on the loading dock, and a piston mounted within the cylinder and having an exposed portion to which an attaching means is connected. The attaching means is adapted to be releasably connected to the truck. Control means is provided for directing hydraulic pressure to the cylinder so as to effect movement of the piston in one direction whereby the attaching means exerts a pulling force on the truck to cause the latter to be secured against the loading dock surface, or in a second direction whereby the attaching means assumes a position wherein it may be disconnected from the truck. Signal means, responsive to hydraulic pressure, is provided to indicate when hydraulic pressure is being, or not being, exerted on the piston.

8 Claims, 5 Drawing Figures

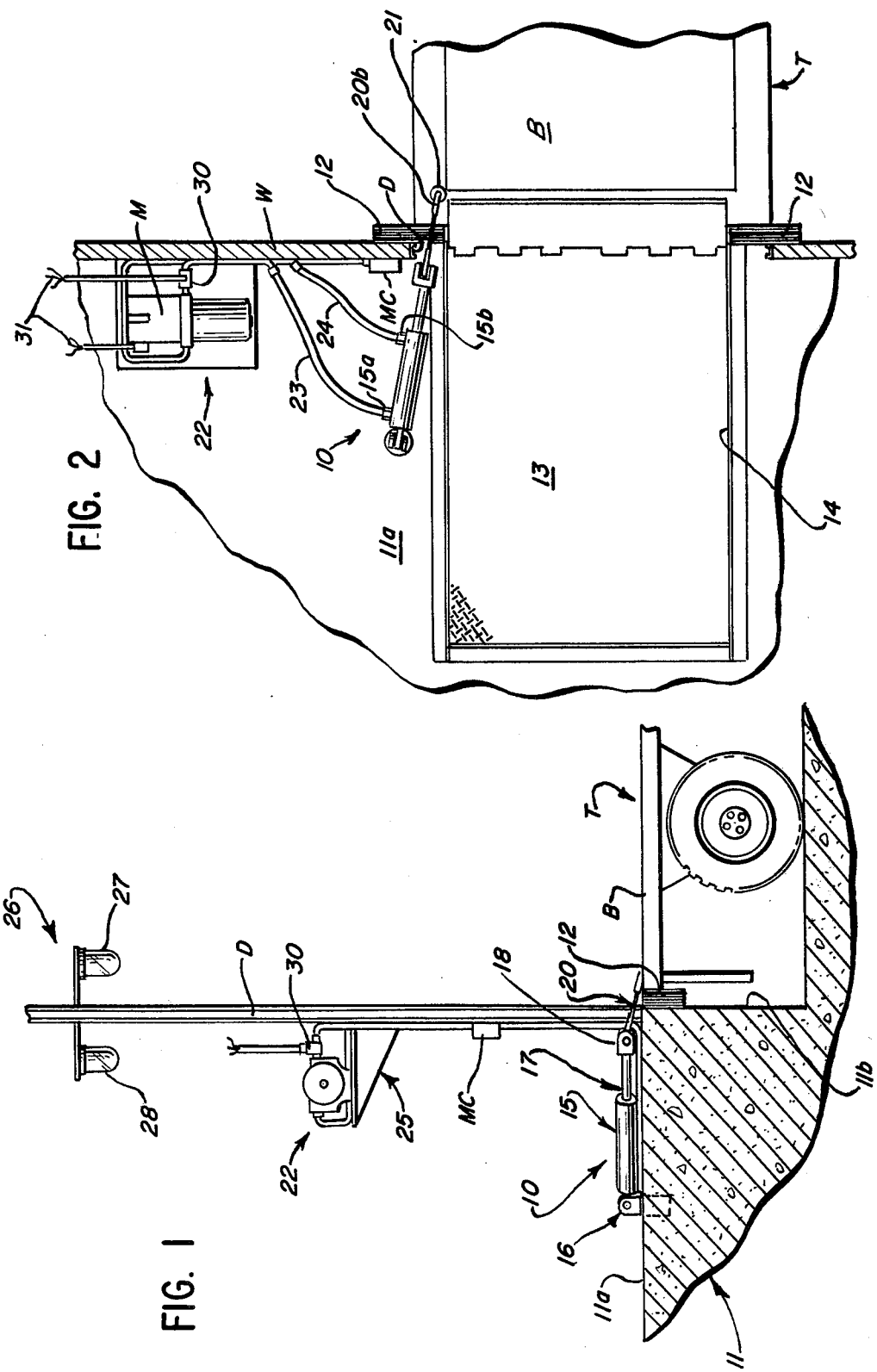

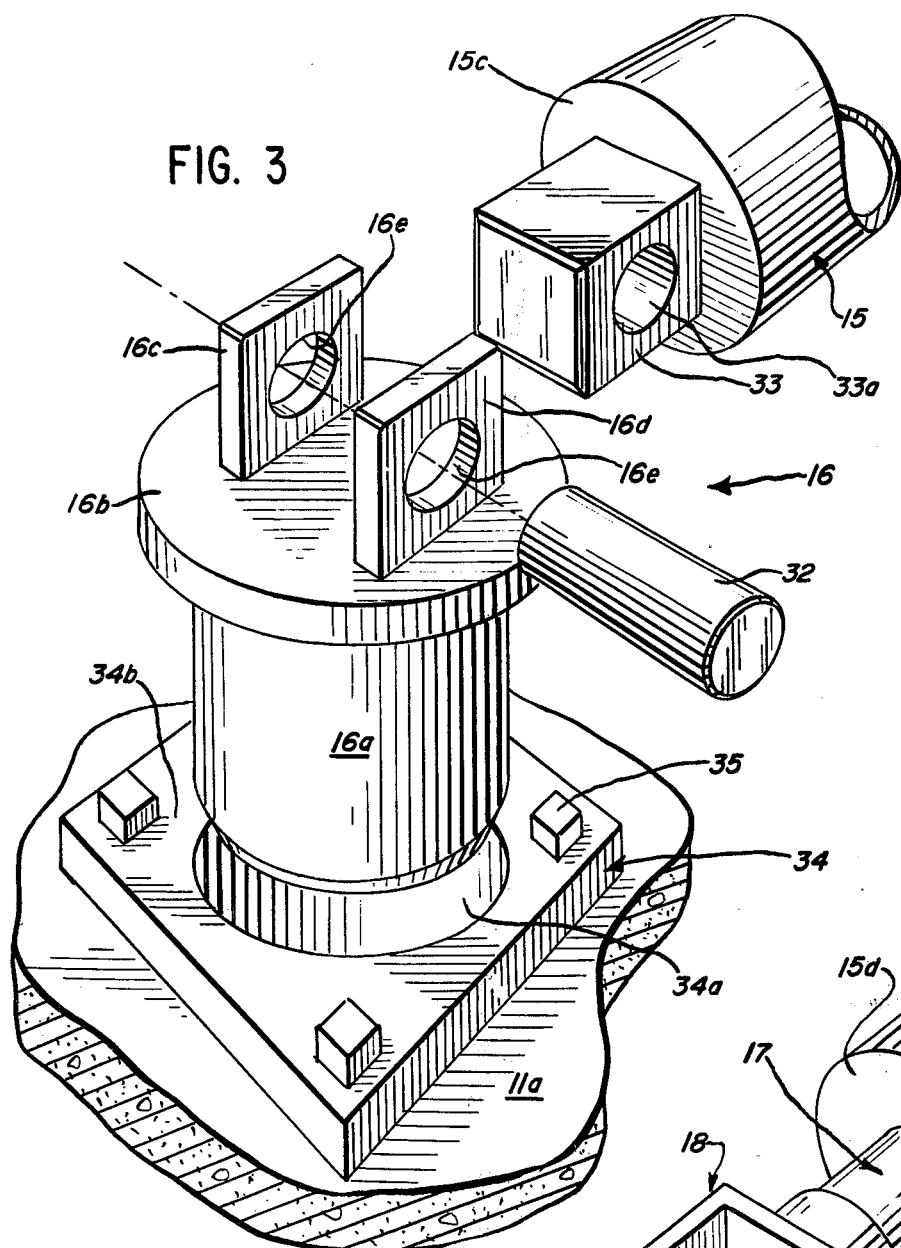

HYDRAULIC SECURING DEVICE

BACKGROUND OF THE INVENTION

In the loading and/or unloading of trucks parked at a loading dock it is oftentimes necessary to utilize forklift equipment and the like to facilitate and expedite the loading and unloading operations. It is imperative in such operations that the parked truck remain in a fixed abutting position with respect to the loading dock until the loading and/or unloading operations have been completed so as to prevent serious accidents to both personnel and equipment. Heretofore various means such as wheel blocks and/or inclined approaches or ramps to the loading dock have been employed to assure that the rear end of the truck rests against the dock surface. Such approaches to the problem, however, are not foolproof because the driver of the truck might inadvertently pull away from the dock without first ascertaining whether the loading and/or unloading operation is completed. Furthermore, when ice or snow has accumulated on the inclined approach or ramp, moving the truck away from the dock after the loading and/or unloading operation has been completed might be difficult and frustrating.

In other instances in the past, complex and costly securing devices have been utilized which (a) are difficult to operate and/or maintain in proper working order; (b) are susceptible to vandalism or damage; (c) seriously impede normal maneuvering of the truck itself or the equipment utilized for the loading and/or unloading operations; (d) are unreliable and are adversely affected by certain climatic conditions; (e) are awkward to manipulate and are not capable of being used with a variety of truck sizes and shapes; and (f) require substantial and costly modifications to be made to existing loading docks in order to properly install such prior devices.

SUMMARY OF THE INVENTION

Thus, it is an object of the invention to provide a device of the type described which is not beset with the shortcomings associated with prior structures.

It is a further object of the invention to provide a device of the type described which is of simple compact construction and may be readily replaced or serviced when required.

It is a still further object of the invention to provide a device of the type described which is efficient to operate and may be readily utilized in conjunction with other loading dock equipment (e.g., dock levelers, etc.).

It is a still further object of the invention to provide a device of the type described which is not hazardous to either personnel or the truck engaged thereby.

Further and additional objects will appear from the description, accompanying drawings, and appended claims.

In accordance with one embodiment of the invention, a device of the type described is provided which includes a self-aligning hydraulic cylinder mounted on a loading dock against which the rear end of a truck is adapted to abut. A piston is adjustably mounted within the cylinder and has a portion thereof projecting from one end of the cylinder. An attaching means is connected to the projecting piston portion and is adapted to releasably engage the truck. Adjustable control means is provided which, when in a first position of adjustment, directs hydraulic pressure to the cylinder to effect movement of the piston in one direction whereby the truck-connected attaching means exerts a pulling force on the truck causing the rear end thereof to be secured in abutting relation with a surface of the loading dock, and, when in a second position of adjustment, causes the hydraulic pressure to effect movement of the piston in the opposite direction to a position whereby the attaching means can be disconnected from the truck.

BRIEF DESCRIPTION OF THE DRAWINGS

For a more complete understanding of the invention reference should be made to the drawing wherein:

FIG. 1 is a fragmentary side elevational view showing one form of the hydraulic securing device mounted on a loading dock and with the rear end of a truck secured thereagainst.

FIG. 2 is a fragmentary top plan view of the device, loading dock, and truck rear end shown in FIG. 1.

FIG. 3 is an enlarged fragmentary exploded view, shown in perspective, of one form of a swivel support for connecting the hydraulic cylinder to the deck of the loading dock.

FIG. 4 is an enlarged fragmentary perspective view showing the attaching means connected to the exposed end of the piston.

FIG. 5 is a wiring diagram for one form of the signal means embodied in the device.

DESCRIPTION OF THE PREFERRED EMBODIMENT

Referring now to the drawings and more particularly to FIGS. 1 and 2, one form of the hydraulic securing device 10 is shown installed in a conventional loading dock 11 normally provided in warehouses, truck terminals, manufacturing plants, etc. wherein raw materials and/or finished products are received and/or dispatched via motor vehicles, such as trucks T provided with a bed B on which the materials or products are carried.

The conventional loading dock 11 is normally provided with a horizontal surface or deck 11a over which forklift equipment and the like are maneuvered during the loading and unloading operation. In addition, the dock 11 normally includes a vertical wall or surface 11b against which the rear end of the truck abuts during the loading and unloading operations. The surface 11b is provided with suitable bumpers or fenders 12 which are engaged by the truck rear end thereby preventing damage or defacement of either the dock or the truck when the latter is backing into position.

The deck 11a of the dock is oftentimes provided with a leveler assembly 13 which is adapted to compensate for height differentials between the deck 11a and the upper supporting surface of the truck bed B. The mechanism, not shown, for effecting adjustment of the leveler assembly is customarily disposed within a pit 14 formed in the deck of the dock. The leveler assembly and its associated mechanism and controls form no part of the instant invention.

Access to the deck 11a from the truck bed B is normally through a doorway or opening D formed in a partition or outside wall W. When the loading or unloading operation is not in progress the doorway D is closed by an overhead door or the like, not shown.

The securing device 10 includes a hydraulic cylinder 15 which in the illustrated embodiment, is connected at one end to a swivel support 16 located on the top surface 11a of the dock 11 inwardly of the doorway D, see FIG. 3. Disposed within the cylinder 15 is a piston having a portion 17 thereof projecting from the opposite end of the cylinder. Piston portion 17 has a bifurcated connector 18 affixed to the end thereof to which, in turn, is connected one end 20a of an attaching means 20. The attaching means preferably comprises a predetermined length of cable capable of withstanding substantial tension loads (e.g., 1803 pounds/square inch). The length of the cable 20 will depend upon the axial dimension of the cylinder 15, the distance the support 16 is from the front surface 11b of the dock 11, the travel of the piston within the cylinder, the extent to which the bumpers 12 protrude from the dock surface 11b, and the location on the truck where the free end 20b of the cable will be connected. The free end 20b of the cable may be in the form of a hook which is adapted to engage an opening 21 or other suitable means provided along one side of the truck bed B, see FIG. 2. The opposite end 20a of the cable may be in the form of an eye, through which a connecting pin 19 extends. The pin also extends through aligned holes formed in the connector 18, see FIG. 4.

A motor-pump-tank assembly 22 is provided which is adapted to supply hydraulic pressure to the cylinder 15 through suitable tubing 23, 24. The motor M, which comprises a component of the assembly 22, may be of a reversible type and depending upon its direction of operation will supply hydraulic pressure through either tubing 23 or tubing 24. As seen in FIG. 2 tubing 23, 24 are connected to ports 15a, 15b, respectively, formed in cylinder 15. Port 15a is located adjacent the end 15c of the cylinder which is connected to swivel support 16. Port 15b, on the other hand, is located adjacent the end 15d of the cylinder from which the portion 17 of the piston protrudes.

Suitable manual controls MC are provided for operating the motor M. In FIG. 1, it will be noted that the assembly 22 is supported by an elevated bracket 25 mounted on an interior wall surface so as not to obstruct or interfere with the loading or unloading operation, and so as not to be susceptible to unauthorized tampering or vandalism. The controls may be located adjacent the doorway D, so that the operator can observe the truck while manipulating the controls.

Associated with the assembly 22 is a signal unit 26 which may be of a visual or audio type, or a combination of both. In the illustrated embodiment, the signal unit 26 is of the visual type and comprises a plurality of lights 27, 28. Light 27 is mounted on the exterior wall surface where it may be observed by the driver of the truck while seated in the truck cab. Light 28 may consist of two lights of contrasting colors which are mounted on the interior wall surface. When the motor M is operating and the attaching member 20 is connected to the truck bed B and is exerting a pulling force thereon, the outdoor light 27 and one of the indoor lights will be illuminated continuously or in a flashing sequence, indicating to the driver that his truck is properly secured to the dock surface 11b and that he should not attempt to move the truck. The one illuminated indoor light will indicate to persons inside the building that the device is in operation and the truck is properly positioned so that the loading and unloading operation can be performed.

When the other indoor light 28 is illuminated it indicates that the assembly is turned on but that the attaching member 20 is not exerting a predetermined pulling force on the truck.

As seen in FIGS. 1 and 2, a pressure switch 30 of conventional design is interposed between the assembly 22 and the tubing 23, 24 and is responsive to the hydraulic pressure differential generated within the tubing 23, 24. Electrical wiring 31 connects the switch 30 to the lights 27, 28. The wiring between the switch 30, lights 27, 28 and the power supply is shown in FIG. 5. Suitable check valves, not shown, may be incorporated in the hydraulic system to retain the attaching member in its operative condition whereby the necessary pulling force will be exerted so as to hold fast the rear end of the truck against the loading dock.

The swivel support 16, illustrated in FIG. 3, has a substantial oarlock configuration and includes a cylindrical stub or pintle portion 16a which depends from a central disc or plate 16b. Projecting upwardly from the opposite side of plate 16b is a pair of spaced substantially parallel ears or lugs 16c, 16d. The ears are provided with transversely aligned openings 16e which are adapted to accommodate a connecting pin 32. The ears are adapted to accommodate therebetween a tongue 33 which extends axially from the rear end 15c of the cylinder. The tongue is provided with an opening 33a which aligns with ear openings 16e to receive the pin 32.

The depending stub 16a is journaled with a plate 34 and spacer blocks 35 to the top surface 11a of the loading dock 11. The plate 34 is provided with a depending sleeve 34a which is sized to slidably accommodate the stub 16a. A suitable hole, not shown, must be formed in the dock surface 11a to receive the sleeve 34a. The spacer blocks 35 are arranged a sufficient radial distance from the axis of sleeve 34a to permit the disc 16b to slidably engage the exposed surface 34b surrounding the sleeve 34a. Because of the swivel support 16, the hydraulic cylinder will self-align itself in the direction of the pulling force being exerted on the truck by the attaching member 20.

As an alternative, the swivel support may be mounted on the base of the pit 14 in which the dock leveler assembly is located.

Thus, it will be seen that an effective and efficient securing device has been provided which is of simple, yet compact construction and is capable of operating under widely varying climatic conditions. The shape, size and location of the various components comprising the device may vary from that shown and will depend to a great extent on the physical environment in which it is to be located.

We claim:

1. A device for use in fixedly securing the end of a truck against one surface of a dock unit during loading and unloading thereof, said device comprising a self-aligning hydraulic cylinder adapted to be mounted on the dock unit, and a piston mounted within said cylinder, said piston having an exposed portion adapted to project from one end of said cylinder in a direction towards the truck; attaching means carried by the piston exposed portion and having an end adapted to be releasably connected to the truck; hydraulic fluid pressure means connected to said hydraulic cylinder; and adjustable control means for directing hydraulic fluid pressure to selected portions of said cylinder to effect movement of said piston in predetermined directions; said control means, when in a first position of adjustment, effecting movement of said piston in one direction whereby the truck-connected attaching means is adapted to exert a pulling force on the truck and hold fast the latter in abutting relation against the dock unit one surface, and when in a second position of adjustment, effecting movement of said piston in a second direction to a predetermined position whereby the end of said attaching means is adapted to be disconnected from the truck.

2. The device of claim 1 wherein a second end of said hydraulic cylinder opposite the one end from which the exposed portion of the piston projects, is adapted to be pivotally connected to the dock unit.

3. The device of claim 2 wherein the second end of said hydraulic cylinder is pivotally connected to a swivel support, the latter being adapted to be mounted on a second surface of the dock unit which is disposed substantially parallel to the direction of pulling force exerted by the attaching means on the truck.

4. The device of claim 3 wherein the swivel support has a substantial oarlock configuration and includes a pintle portion adapted to be journaled in a bearing provided on the dock unit second surface.

5. The device of claim 1 wherein the control means includes signal means mounted in spaced relation with respect to said hydraulic cylinder, said signal means being responsive to a predetermined force exerted by the attaching means when retaining the truck end in abutting relation against the dock unit first surface.

6. The device of claim 5 wherein the signal means includes illuminating means having at least a portion thereof being adapted to illuminate only when said attaching means is exerting said predetermined force.

7. The device of claim 5 wherein said signal means includes a first illuminating means adapted to illuminate only when said attaching means is exerting a predetermined truck-retaining force, and a second illuminating means adapted to illuminate only when said attaching means is exerting a force less than said predetermined truck-retaining force.

8. The device of claim 1 wherein the attaching means includes a cable of predetermined length.

* * * * *